United States Patent
Rudzinsky et al.

(10) Patent No.: US 10,677,891 B2
(45) Date of Patent: Jun. 9, 2020

(54) SYSTEMS AND METHODS FOR WAVE SENSING AND SHIP MOTION FORECASTING USING MULTIPLE RADARS

(71) Applicant: Applied Physical Sciences Corp., Groton, CT (US)

(72) Inventors: Jason P. Rudzinsky, Groton, CT (US); John G. Kusters, Jr., Groton, CT (US); Benjamin S. H. Connell, Groton, CT (US); Christopher S. Brundick, Groton, CT (US); Kevin Cockrell, Groton, CT (US); William M. Milewski, Groton, CT (US)

(73) Assignee: Applied Physical Sciences Corp., Groton, CT (US)

( * ) Notice: Subject to any disclaimer, the term of this patent is extended or adjusted under 35 U.S.C. 154(b) by 264 days.

(21) Appl. No.: 15/704,906

(22) Filed: Sep. 14, 2017

(65) Prior Publication Data

US 2018/0081054 A1 Mar. 22, 2018

Related U.S. Application Data

(60) Provisional application No. 62/395,977, filed on Sep. 16, 2016.

(51) Int. Cl.
*G01S 7/24* (2006.01)
*G01S 13/937* (2020.01)
(Continued)

(52) U.S. Cl.
CPC .................... *G01S 7/24* (2013.01);
*G01S 7/04* (2013.01); *G01S 13/50* (2013.01);
*G01S 13/605* (2013.01);
(Continued)

(58) Field of Classification Search
CPC ........ G01S 7/24; G01S 13/9307; G01S 13/91; G01S 13/50; G01S 7/04; G01S 13/874;
(Continued)

(56) References Cited

U.S. PATENT DOCUMENTS 3,727,217 A 4/1973 Nirasawa
3,806,929 A * 4/1974 Moore .................... G01S 13/64
342/90

(Continued)

FOREIGN PATENT DOCUMENTS

EP 1990651 A1 * 11/2008 ......... G01S 13/9307
EP 2167916 B1 3/2010
(Continued)

OTHER PUBLICATIONS

International Bureau of WIPO, International Search Report and Written Opinion of the International Searching Authority received for Application No. PCT/US2017/051640, dated Jul. 11, 2018.
(Continued)

*Primary Examiner* — Bernarr E Gregory
(74) *Attorney, Agent, or Firm* — LKGlobal | Lorenz & Kopf, LLP

(57) ABSTRACT

Ship motion forecasting systems and methods are described herein that can enable accurate real-time forecasting of ocean waves and resultant ship motions. Such systems and methods can be used to improve the efficiency and safety of a variety of ship operations, including the moving of cargo between ships at sea. In general, the systems and methods transmit radar signals from multiple radars, and those radar signals from the multiple radars are reflected off the surface of a body of water. The reflected radar signals are received, and radar data is generated from the received radar signals. The radar data is used to generate ocean wave components, which represent the amplitude and phase of a multitude of
(Continued)

individual waves that together can describe the surface of the ocean. These ocean wave components are then used generate ship motion forecasts, which can then be presented to one or more users.

18 Claims, 8 Drawing Sheets

(51) Int. Cl.

| | |
|---|---|
| G01S 13/60 | (2006.01) |
| G01S 13/86 | (2006.01) |
| G01S 13/62 | (2006.01) |
| G01S 7/04 | (2006.01) |
| G01S 13/87 | (2006.01) |
| G01S 13/91 | (2006.01) |
| G01S 13/50 | (2006.01) |
| B63B 39/14 | (2006.01) |
| G01S 13/00 | (2006.01) |

(52) U.S. Cl.
CPC .............. *G01S 13/62* (2013.01); *G01S 13/86* (2013.01); *G01S 13/874* (2013.01); *G01S 13/91* (2013.01); *G01S 13/937* (2020.01); *B63B 39/14* (2013.01)

(58) Field of Classification Search
CPC ........ G01S 13/86; G01S 13/62; G01S 13/605; G01S 13/913; G01S 13/64; G01S 17/95; B63B 39/14; G05D 1/0875; G01C 13/002; G01C 13/006
See application file for complete search history.

(56) References Cited

U.S. PATENT DOCUMENTS

| | | | | | |
|---|---|---|---|---|---|
| 5,381,222 | A | * | 1/1995 | Palmer | G01S 17/95 |
| | | | | | 356/4.01 |
| 6,382,022 | B1 | * | 5/2002 | Martinez | G01C 13/002 |
| | | | | | 73/178 R |
| 6,586,748 | B1 | * | 7/2003 | Lloyd | G01C 13/006 |
| | | | | | 250/453.11 |
| 8,305,257 | B2 | | 11/2012 | Trizna | |
| 8,494,697 | B2 | | 7/2013 | Ballou et al. | |
| 8,643,509 | B1 | | 2/2014 | Chen et al. | |
| 9,783,272 | B2 | * | 10/2017 | Edmunds | G05D 1/0875 |
| 2007/0225915 | A1 | | 9/2007 | Weinzapfel et al. | |
| 2014/0114509 | A1 | | 4/2014 | Venables et al. | |
| 2015/0183497 | A1 | | 7/2015 | Drouet et al. | |

FOREIGN PATENT DOCUMENTS

| | | | | | |
|---|---|---|---|---|---|
| GB | | 2320829 A | * | 7/1998 | ........... G01S 13/913 |
| WO | | 2017185020 A1 | | 10/2017 | |

OTHER PUBLICATIONS

Amarcon B.V., "Octopus-Onboard the New Generation Decision-Making Support System to Optimize Ship Performance in Waves" The Netherlands, Dec. 31, 2006 (Dec. 31, 2006), Xp055212381, Retrieved From The Internet: Url:Http://Www.Messe.No/Exhibitordocuments /76960/378/0ctopus V5.Pdf [Retrieved on Sep. 9, 2009] The Whole Document.
Konstanze Reichert et al: "X-Band Radar 1-20 Derived Sea Surface Elevation Maps as Input to Ship Motion Forecasting", Oceans 2010 IEEE—Sydney, IEEE, Piscataway, Nj, USA, May 24, 2010 (May 24, 2010), pp. 1-7, Xp031777119, ISBN: 978-1-4244-5221-7, Abstract; Figure 1.
Katrin Hessner et al: "The On-Board Wave 1-20 and Motion Estimator OWME", Proceedings of The Twentieth (2010), International Offshore and Polar Engineering Conference, Jun. 25, 2010 (Jun. 25, 2010), pp. 424-431, Xp055485214, Abstract; Figure 1.
Gunther F. Clauss et al: "Critical Situations of Vessel Operations in Short Crested Seas-Forecast and Decision Support System", Journal of Offshore Mechanics and Arctic Engineering, vol. 134, No. 3, Jan. 1, 2012 (Jan. 1, 2012), p. 031601, Xp055485222, Us Issn: 0892-7219, DOI 10.1115/1A004515, The Whole Document.
A.P. Wijaya et al: "Reconstruction and Future Prediction of The Sea Surface from Radar Observations", Ocean Engineering, vol. 106, Sep. 1, 2015 (Sep. 1, 2015), pp. 261-270, Xp055485219, Amsterdam, NL ISSN: 0029-8018, DOI: 10.1016/J.Oceaneng.2015.07.009; The Whole Document.
International Bureau of WIPO, International Search Report and Written Opinion for International Application No. PCT/US2017/051639, dated Jul. 11, 2018.
Tyson Hilmer, et al., Deterministic Wave Prediction from the WaMoS II, Oceans 2014, Taipei, IEEE, Apr. 7, 2014, pp. 1-8.
Tyson Hilmer, et al., Observations of Predictive Skill for Real-Time Deterministic Sea Waves from the WaMoS II, Oceans 2015, MTS/IEEE Washington, MTS, Oct. 19, 2015, pp. 1-7.
Katrin Hessner et al., The On-Board Wave and Motion Estimator OWME, Proceedings of the Twentieth (2010) International Offshore and Polar Engineering Conference, Jun. 25, 2010, pp. 424-431.
W. E. Cummins, The Impulse Response Function and Ship Motions, Hydromechanics Laboratory Research and Development Report, Report No. 1661, Oct. 1962.
Rodney T. Schmitke, Ship, Sway, Roll, and Yaw Motions in Oblique Seas, The Society of Naval Architects and Marine Engineers (SNAME) Transactions, vol. 86, 1978, pp. 26-46, Nov. 16, 1978.
Professor Yoji Himeno, Prediction of Ship Roll Damping-State of the Art, Department of Naval Architecture and Marine Engineering, University of Michigan College of Engineering, Research Paper, No. 239, Sep. 1981, Ann Arbor, Michigan (USA).
William J. Plant, et al., Evidence of Bragg Scattering in Microwave Doppler Spectra of Sea Return, Journal of Geophysical Research, Sep. 15, 1990, vol. 95, No. C9, pp. 16,299-16,310, U.S. Naval Research Laboratory, Washington, D.C.
Kevin McTaggart, Appendage and Viscous Forces for Ship Motions in Waves, Technical Memorandum, Sep. 2004, Defence R&D Canada—Atlantic, DRDC Atlantic TM 2004-227.
Tristan Perez, et al., Time vs. Frequency-domain Identification of Parametric Radiation Force Models for Marine Structures at Zero Speed, Modeling, Identification and Control, vol. 29, No. 1, 2008, pp. 1-19.
Jorrit-Jan Serraris, Time Domain Analysis for DP Simulations, Proceedings of ASME 28th International Conference on Ocean, Offshore and Arctic Engineering OMAE2009, May 31-Jun. 5, 2009, Honolulu, Hawaii.
Okey G. Nwogu, et al., Surface-Wavefield Estimation from Coherent Marine Radars, IEEE Geoscience and Remote Sensing Letters, Research Paper, Nov. 12, 2009, Department of Naval Architecture and Marine Engineering, University of Ann Arbor, MI USA.
Dick K.P. Yue, et al., Phase-Resolved Reconstruction and Forecast of Ocean Wavefields Using Scanning-Sensing Wave Measurements, Report, Jan. 26, 2010, Massachusetts Institute of Technology, Cambridge, MA.
Xu Xiang, et al., Time Domain Simulation of Two Interacting Ships Advancing Parallel in Waves, Proceedings of ASME 2011 30th International Conference on Ocean, Offshore and Arctic Engineering OMAE2011, Jun. 19-24, 2011, Rotterdam, Netherlands.
William J. Plant, et al., Wave Shadowing and Modulation of Microwave Backscatter from the Ocean, Journal of Geophysical Research, Aug. 4, 2012, Vol. 117, C08010, doi: 101 029/2012JC007912, 2012.
Christine C. Schleicher, et al., Assessment of Linear Seakeeping Performance Prediction of the R/V Melville, Report, Jul. 2014, Naval Surface Warfare Center, Carderock Division, NSWCCD-80-TR-2014/021.
Benjamin S. H. Connell, et al., Development of an Environmental and Ship Motion Forecasting System, Proceedings of ASME 2015 34th International Conference on Ocean, Offshore and Arctic Engineering OMAE2015-42422, May 31-Jun. 5, 2015, Newfoundland, Canada.

(56) References Cited

OTHER PUBLICATIONS

William M. Milewski, et al., Reduced Order Model for Motion Forecasts of One or More Vessels, Proceedings of ASME 2015 34th International Conference on Ocean, Offshore and Arctic Engineering OMAE2015-42421, May 31-Jun. 5, 2015, Newfoundland, Canada.
J.G. Kusters, et al., FutureWaves—A Real-Time Ship Motion Forecasting System Employing Advanced Wave-Sensing Radar, Applied Sciences Corporation, USA, Sep. 20, 2016.
Gordon Farquharson, et al., Wave Sensing Radar and Wave Reconstruction, Applied Sciences Corporation, Distribution, Jul. 14, 2015.
The International Bureau of WIPO, International Search Report and Written Opinion in Application No. PCT/US2018/61805, dated Feb. 1, 2019.

\* cited by examiner

SYSTEMS AND METHODS FOR WAVE SENSING AND SHIP MOTION FORECASTING USING MULTIPLE RADARS

PRIORITY CLAIM

This application claims the benefit of U.S. Provisional Patent Application 62/395,977, filed Sep. 16, 2016, the contents of which are incorporated by reference in their entirety.

GOVERNMENT RIGHTS

This invention was made with government support under contract N00014-11-D-0341 awarded by the United States Navy Office of Naval Research (ONR). The government has certain rights in the invention.

TECHNICAL FIELD

The present invention generally relates to wave sensing, and more particularly relates to wave sensing with multiple radars and using the resultant determined wavefield to forecast ship motions.

BACKGROUND

Many ocean-based evolutions require the offshore mooring of ships together in order to transfer people, material, or other items. For example, cargo transportation between ships can include the mooring of ships together offshore in order to transport cargo and equipment between them. These operations become challenging when there is relative motion between the ships due to ocean waves. To overcome these challenges there is a need for sensing waves in the proximity of the ships and the generation of the resultant ship motion forecasts.

DESCRIPTION OF EMBODIMENTS

The embodiments described herein provide systems and methods for providing forecasts of future ship motion. The embodiments described herein can enable accurate, near real-time forecasting of ocean waves and resultant ship motions. Such systems and methods can be used to improve the efficiency and safety of a variety of ship operations, including the moving of cargo between ships at sea.

In general, the systems and methods transmit radar signals that are reflected off the surface of a body of water. The reflected radar signals are received, and radar data is generated from the received radar signals. The radar data is used to generate ocean wave components, which represent the amplitude and phase of a multitude of individual waves that together can describe the surface of the ocean. These ocean wave components are then used to estimate future applied forces on a ship on the body of water. The estimate of future applied forces is then used to generate ship motion forecasts, which can then be presented to one or more users. For example, they can be presented ship cargo operators and used to determine when ship-to-ship transfers of cargo can be safely performed. In particular, the systems and methods described herein can facilitate improved safety in complex ship-to-ship (S2S) operations.

Figure 1:
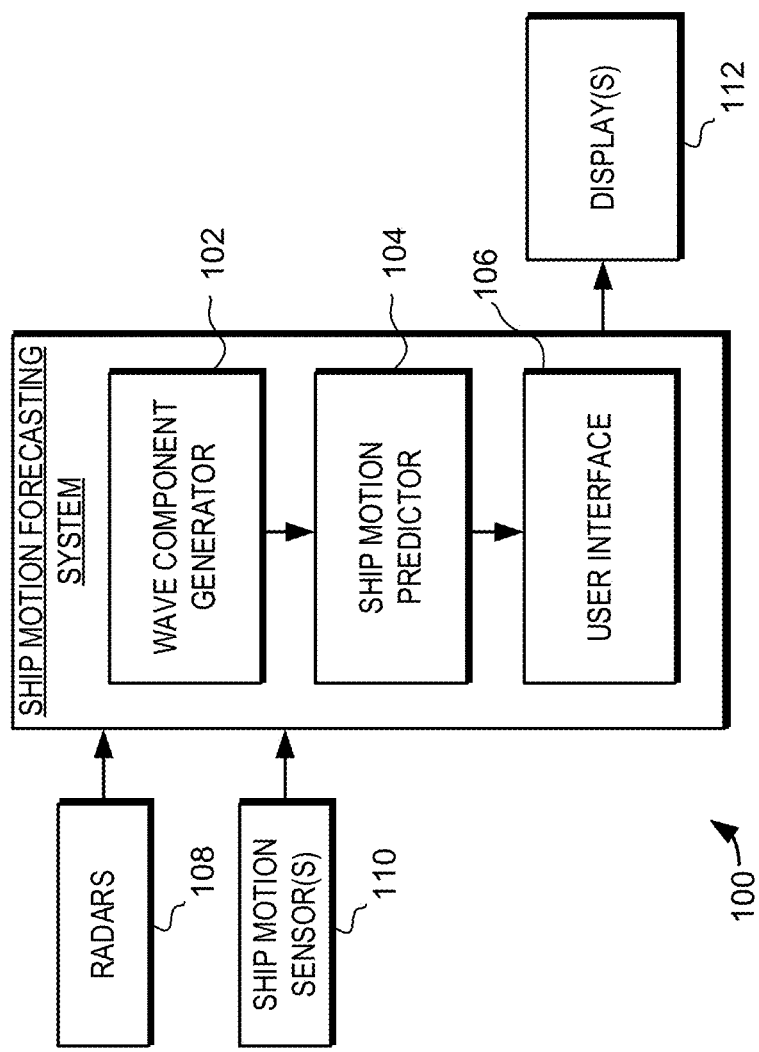
FIG. 1 shows a schematic diagram of ship motion forecasting system in accordance with various embodiments of the present invention.

Turning now to FIG. 1, a schematic diagram of an exemplary ship motion forecasting system 100 is illustrated. The ship motion forecasting system 100 includes a wave component generator 102, a ship motion predictor 104, and a user interface 106. In general, the ship motion forecasting system 100 receives radar data from radars 108 and ship motion data from the ship motion sensor 110.

The ship motion sensor 110 provides measurement data of ship motions for an associated ship or ships. For example, the ship motion sensor 110 can provide ship motion measurements for one or more of the six degrees of freedom (pitch, heave, roll, sway, surge and yaw) in which a ship can move. Such motion measurements can be used by the ship motion forecasting system 100 to provide an initial kinematic state or state history of the ship from which the impact of future waves can be determined. Additionally, in some embodiments the ship motion sensor 110 or other sensors and systems can provide ship tracking direction and ship location information. For example, Global Positioning System (GPS) systems and/or orientation devices (e.g. Inertial Measurement Unit (IMU)) can provide ship direction and tracking information to the ship motion forecasting system 100.

The radars 108 provide radar data to the ship motion forecasting system 100. Using this radar data and the data from the ship motion sensor 110, the ship motion forecasting system 100 generates ship motion forecasts that predict the future motion of one or more ships. Specifically, the wave component generator 102 is configured to receive the radar data from the radars 108 and generate the ocean wave components that describe waves likely to impact the ship. The ship motion predictor 104 uses these ocean wave components to generate ship motion forecasts.

In general, the ocean wave components are numerical representations of wave characteristics, and thus can include numerical representations of the wave height (e.g., amplitude) and wave timing (e.g. phase) of discrete wave frequencies and directions on a portion of the water surface. These ocean wave components can collectively be used to characterize the surrounding wave field on the water surface at the present and for the near term future. These ocean wave components can thus provide phase-resolved ocean surface height representations of waves on the water surface that can be used to generate real time ship motion prediction. Such phase-resolved ocean surface heights can be combined with time geographic (i.e., spatiotemporal) location information of the forecasted waves along with spectral (i.e., direction, period, and energy) information to generate future ship motion forecasts.

The user interface 106 is configured to generate one or more indications of the ship motion forecasts and display those indications on the display(s) 112. In general, the indications of ship motion forecasts can comprise any type of graphical or other representation of the ship motion forecasts that can be outputted to the display(s) 112 and provided to a user.

The ship motion forecasts generated by the ship motion forecasting system 100 predict the future motion of the ship for at least one degree of freedom (pitch, heave, roll, sway, surge and/or yaw) and for a determined period of time. These ship motion forecasts can be generated as discrete time domain signals that extend from a current time to a future time. As one specific example, the ship motion forecasting system 100 can be implemented to predict and provide a time domain signal forecasting heave for 30~180 seconds in future time with each new forecast. Additionally, the ship motion forecasting system 100 can be implemented to repeatedly generate these ship motion forecasts.

For example, the ship motion forecasting system 100 can be configured to generate a new ship motion forecast with each new processing cycle where new data is available from the radar(s) 108 and ship motion sensor(s) 110. In such an embodiment a new ship motion forecast would typically be generated every 1~3 seconds, with each new forecast providing a new prediction of ship motion for the following 30~180 seconds. These new forecasts can be displayed or otherwise outputted individually or in combination with past forecasts and other data.

In some embodiments the ship motion forecasting system 100 can be implemented to forecast ship motions for a single ship in open water. In other embodiments the ship motion forecasting system 100 can be implemented to forecast ship motions for two or more ships coupled together though a non-negligible mechanical coupling (e.g., rope and fender) or hydrodynamic forces. Furthermore, the ship motion forecasting system 100 can be implemented to predict ship motions for stationary ships, moving ships, or combinations of both. Furthermore, it should be noted the ship motion forecasting system 100 could be implemented to predict motion in any type of ship, including but not limited to large transport ships, roll-on roll-off ships, tankers, drilling vessels or platforms, construction vessels or platforms, supply vessels, production vessels or platforms, etc.

Notably, the ship motion forecasting system 100 uses multiple radars 108 to generate the ship motion forecasts. Each of these multiple radars 108 would include its own radar transceiver, and thus each of the multiple radars 108 is able to independently transmit and receive radar signals. Each of the multiple radars 108 can thus independently transmit radar signals that reflect off the water surface, are received, and are used to generate radar data. For example, a system with first and second radars can be used to generate first radar data from the first radar and second radar data from the second radar. The radar data from the multiple radars 108 can then combined and used to generate the ocean wave components by the ocean wave component generator 102. The generated ocean wave components are then used to generate the ship motion forecasts.

The use of multiple radars 108 can improve the forecasting of wave and ship motion in a variety of ways. For example, the use of multiple radars 108 can increase the accuracy the generated ocean wave components by inputting more observations of the ocean surface. The use of multiple radars 108 also effectively increases the signal-to-noise ratio of the radar signals used to generate ocean wave components. Increased signal-to-noise ratio reduces the error in the wave computational process and yields more accurate wave field calculations and thus more accurate ship motion forecast. The use of multiple radars 108 can also increase the scanned area of the water surface and can thus facilitate more comprehensive wave and corresponding ship motion forecasts. For example, in many applications a single radar could not be effectively positioned to provide a full 360 degree scan of the water surface around a ship. However, with multiple radars 108 the different radars can be configured to operate in different regions or at different ranges in a way that together provides full or nearly full 360 degree view of the surrounding area and to the extent of maximum range.

In some embodiments, the radar data from multiple radars 108 is combined by separately generating moment data (i.e. power return, signal-to-noise, frequency shift) from the radar data from each radar, filtering the generated moment data, and then combining the filtered moment data. This combined moment data can then be used to more accurately generate the ocean wave components. In yet other embodiments, the radar data from the multiple radars is combined by generating ocean wave components from radar data from each radar separately and then combining the ocean wave components.

The use of multiple radars 108 in generating ship motion forecasts can be implemented in a variety of ways. For example, the multiple radars can be mounted together on one ship, or can be mounted across multiple ships. In one embodiment, a first radar is positioned to have a view of the body of water proximate the fore region of the ship, while the second radar is positioned on the ship to have a view of the body of water proximate an aft region of the ship. In such an embodiment, the first radar can position in the fore region of the ship, while the second radar is positioned in the aft region of the ship. In another embodiment, a first radar is positioned to have a view of the body of water proximate the starboard region of the ship, while the second radar is positioned on the ship to have a view of the body of water proximate the port region of the ship. In such an embodiment, the first radar can positioned in a starboard region of the ship, while the second radar is positioned in a port region of the ship. Finally, it should be noted that none of these embodiments are limited to using only two radars. And thus three or more radars could also be implemented and used.

In some embodiments, the motion forecast system 100 can combine the generated ship motion forecasts with Meteorological and Oceanographic (METOC) numerical models and direct buoy observations to provide vessel operational planning guidance for longer time periods. For example, such systems can be implemented to provide operational planning for hours and days ahead, and can thus provide advanced planning to ship crews.

So implemented, the ship motion forecasting system 100 can provide detailed, real-time wave characterization in the form of a self-calibrating energy power spectrum, sea heights for various frequency (wave period) bands, and trends of the ocean environment, as well as trends of the measured resultant vessel motions.

Figure 2A:
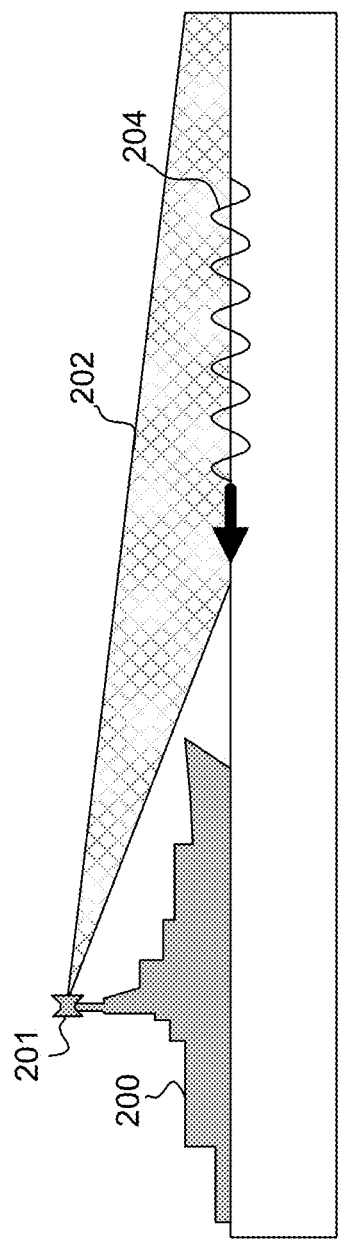
FIGS. 2A and 2B are schematic diagrams of an exemplary ship with a ship motion forecasting system in accordance with various embodiments of the present invention.

Turning now to FIG. 2A, a side view of an exemplary ship 200 is illustrated with at least one radar 201 configured to transmit radar signals 202 toward the water surface 204, where that surface can include waves that are traveling toward the ship 200. These radar signals 202 reflect off the water surface 204, and the reflected radar signals 202 are received back at the ship 200 where they are used to determine a forecast of future ship motion.

Figure 2B:
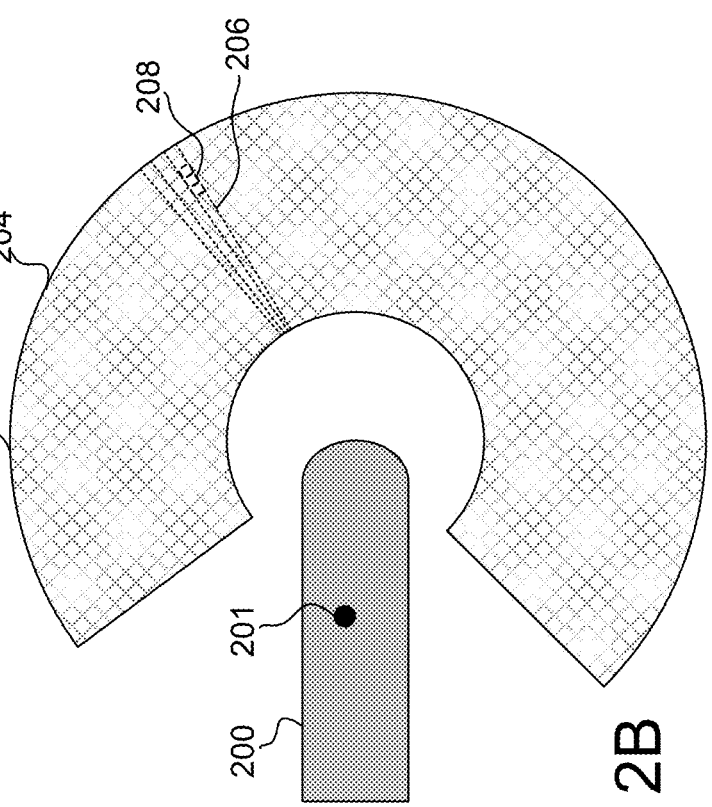

In a typical implementation, the radar 201 antenna rotates while transmitting and receiving the radar signals 202, resulting in an azimuthal and range scan of the water surface 204. Turning now to FIG. 2B, this figure shows a top view of the ship 200 and illustrates an exemplary portion 205 of an azimuthal scan of a water surface. FIG. 2B shows how the portion 205 of the water surface scanned by the radar 201 can be considered to comprise a plurality of azimuthal sectors 206, of which three are illustrated in FIG. 2B. Furthermore, each of these azimuthal sectors 206 is made up of a plurality of area patches 208, of which three are illustrated in FIG. 2B. In this example, each patch 208 has the width of the arc of the corresponding azimuthal and a length determined by the range resolution of the radar. Thus, the area of each patch 208 is approximately the width of the azimuthal sector at the point of the patch multiplied by the range resolution. It should be noted that the example illustrated in FIG. 2B is a very simplified example, and in a typical implementation the radar scan could cover a much larger area, and the scanned water surface could be divided into many more azimuthal sectors 206, which each sector 206 including a very large number of patches 208. For example, with radar having a range of ~5000 meters and a range resolution of ~7.5 meters, the portion 205 could comprise azimuthal sectors each having an arc length of 2.5 degrees, with each sector having ~700 patches. Again, in this embodiment each patch would have an area that is approximately the width of the arc at that location multiplied by the range resolution (e.g., ~7.5 m). Where the radars provide a full 360 degree scan, such an embodiment could provide a total of ~144 azimuthal sectors 206 and ~100,000 patches 208. As will be described in greater detail below, the ship motion forecasting system can be configured to reflect radar signals off the portion 205 of the water surface and generate ocean wave components using applicable portions of the plurality of patches 208 in the plurality of azimuthal sectors 206.

Figure 3:
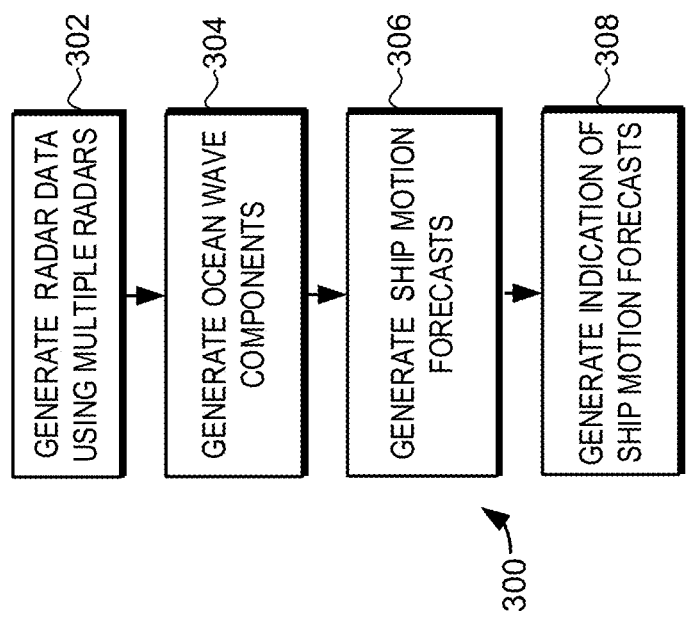
FIG. 3 is flow diagram of an exemplary ship motion forecasting method in accordance with various embodiments of the present invention.

Turning now to FIG. 3, a method 300 of determining ship motion forecasts is illustrated. The method 300 is exemplary of the type of process that can be used to generate ship motion forecasts in accordance with the embodiments described herein. In general, the method 300 uses multiple radars to measure incoming waves and provide forecasts of ship motion that will result from these waves. It should be noted that in a typical implementation the method 300 can be performed repeatedly in cycles, with new ship motion forecasts being generated each cycle. For example, a new radar scan of the water surface and resulting ship motion forecasts can be generated every 1-3 seconds dependent upon radar scanning interval, update frequency, and processor latency.

The first step 302 is to generate radar data using multiple radars. As was described above, the radar data from multiple radars can include data for each of a plurality of patches, where each patch corresponds to one portion of an azimuthal sector of the water surface. To generate this radar data multiple radars are used to transmit radar signals toward the water surface. The radar signals reflect off the water surface and are received back at the radar, where the reflected radar signals are used to generate the radar data. Again, the multiple radars of the ship motion forecasting system can be distributed on various locations on the ship or ships, including fore, aft, starboard, and port regions.

Additionally, a variety of different types of radars can be used in the ship motion forecasting system. For example, the radars can be implemented with X-band Doppler radars. For example, a 2 kilowatt coherent X-band radar with an antenna mounted 30 meters above the water surface can provide accurate Doppler (i.e. frequency-shift) sensing to 5 kilometers, enabling a 5 minute ship motion forecast capability. In such an embodiment the radar can be configured to have an azimuthal resolution of ~2.5 degrees and range resolution of ~7.5 m, and an azimuthal scanning interval of less than 3 seconds. This can result in ~30,000 scanning patches of sizes of 30~1000 square meters being processed per second. As one specific example, the radars can be implemented with marine X-Band (9.4 GHz) Doppler radars. Such radars can be implemented to measure the ocean surface orbital radial-velocities through the Bragg backscattering in an area around the vessels out to several thousand meters. Of course, these are just some examples and other implementations are possible.

Again, the radar signals reflect off the water surface and are received back at the radar, where the reflected radar signals are used to generate the radar data. The next step 304 is to generate ocean wave components from the received radar data. Again, the ocean wave components are numerical representations of wave characteristics, and thus can include numerical representations of the wave height (e.g., amplitude) and wave timing (e.g. phase) of discrete wave frequencies and directions on a portion of the water surface. These ocean wave components can be generated from the radar data for tens-of-thousands of patches per second, where again each patch is a portion of the surface that can be moving a result of the multitude of waves that comprise the surface at any particular time. In general, step 304 determines the ocean wave components that are most consistent with the radar data and will thus describe the overall wave field on the water surface.

In a typical implementation new ocean wave components would be generated for each new set of radar data, with each new set of radar data corresponding to new scans of the radar made during one processing cycle, typically a second or two.

Because the typical wave field does not change rapidly on the time-scale of seconds newly generated wave components can be compared to previous wave components to further refine the component solution using statistical means. For example, consistency from one processing cycle to the next indicates accuracy, and averaging across processing cycles for the same wave component can improve the solution.

In a typical embodiment these ocean wave components would be generated for waves that are likely to cause significant ship motion, while ocean wave components would not be generated for other areas of the water surface. For example, the ocean wave components can be generated from the patches on the water surface that include waves that are likely to impact the ship. This determination of likely impact can be made based on a known or estimated directional wave spectrum and the current ship speed and heading. Furthermore, this initial determination can be made before the ocean wave components are generated and thus can be used to reduce the number of components that need to be generated and thus reduce the amount of computing resources required. As will be described in greater detail below with reference to FIG. 5, such a process can determine which portions of the water surface contain waves that are likely to generate significant ship motion by first generating moment data and then filtering the moment data.

The next step 306 is to generate future ship motion forecasts from the ocean wave components. These future ship motion forecasts can include ship motion forecasts in one or more of the six degrees of freedom (pitch, heave, roll, sway, surge and yaw) that ship motion can occur in. In some embodiments, the future ship motion forecasts can be generated as statistical representations of expected ship motions for various ship courses and speeds. In other embodiments, the future ship motion forecasts can provide precise time-specific predictions of ship motion.

In general, these ship motion forecasts can be generated by determining the forces that will be applied to the ship by each of various wave components that will impact the ship, and combining the results. Again, in a typical embodiment new ship motion forecasts would be generated for each forecast cycle.

In one specific embodiment, a reduced-order model (ROM) for ship motions can be used to determine the ship motions. For example, a reduced-order lumped-parameter time-domain model for ship motions can be used. Such a model can be used with Cummins equation approach to provide the desired computational speed for generating future ship motion predictions. In the Cummins equation motions of one or multiple (N) ships is represented as a 6×N degree-of-freedom system represented by 6×N equations. The formulation uses the state as an initial condition in a time-domain solution, and the state history is used in a convolution with pre-calculated impulse-response functions. An example of such a model can be found at "Development of an Environmental and Ship Motion Forecasting System" by Benjamin S. H. Connell et al, Proceedings of the ASME 2015 34th International Conference on the Ocean, Offshore and Artic Engineering.

Such a model can be used to calculate ship motions for particular ships or particular multi-ship arrangements. The necessary added inertia and hydrostatic restoring terms are pre-calculated from a representation of the ship geometry and input mass specifications. The impulse-response functions and force response amplitude operator functions are pre-calculated through a discretized range of speeds, and wave frequencies and directions, yielding a database which characterizes the hydrodynamic forcing to the ship through all relevant operating conditions. Particular values of these forcing functions are obtained through interpolation of values from the database. The approach uses the assumptions of linear seakeeping theory, where the hydrodynamic forcing can be decomposed into the incident wave, diffraction and radiation forces. The pre-calculated wave-forcing database allows mapping of the discrete wave components to modal forcing of the ship system. Thus, resultant vessel motions for different courses and speeds can be calculated for the recommendation model. This lookup database can then be used during operation of the forecasting system to provide the ship motions that will result from the waves that are forecast to impact the ship.

During operation the generated ocean wave components can then be used as real time inputs to the lookup database, with the lookup database providing necessary terms to calculate the resulting forecasts of ship motions. As one example, the lookup database can provide the coefficients for the Cummins equation that describes the motions of the one or more ships that motions are being forecast for in the particular implementation of the ship forecasting system. Thus, the lookup database with pre-calculated values can be used to provide fast determinations of ship motion forecasts. This can facilitate the real time determination of several minutes of ship motion forecasts for each radar scan and each cycle of wave component calculation.

The next step 308 is to generate an indication of the future ship motion forecasts. In general, the indications of ship motion forecasts can comprise any type of graphical or other representation of the ship motion forecasts that can be outputted to a display (e.g., display(s) 112). For example, a graphical representation can include time domain plots of individual future ship motion forecasts for one or more of the six degrees of freedom. In some embodiments time domain plots for past ship motion forecasts and past measurements of ship motion can be displayed together. Again, such graphical representations can include forecasts and measurements for one or more of the six degrees of freedom that can be determined.

Figure 4:
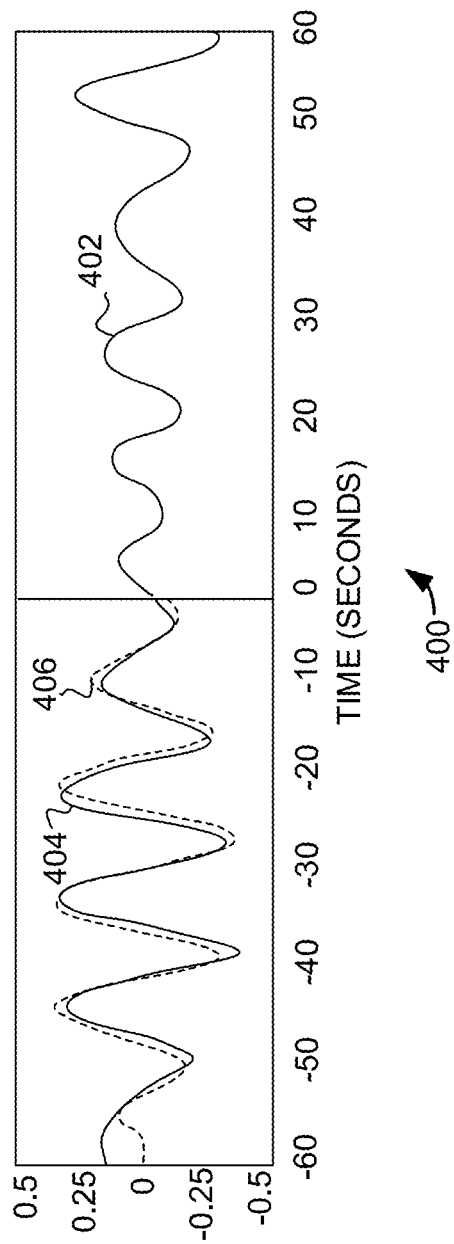
FIG. 4 is a schematic diagram of an exemplary graphical representation of ship motion forecasts in accordance with various embodiments of the present invention.

Turning now to FIG. 4, a schematic diagram of an exemplary graphical representation 400 of a time-domain signal (e.g. roll of a ship) as it would appear on a display screen is illustrated. The graphical representation 400 includes a first time domain plot 402, a second time domain plot 404 and a third time domain plot 406 Specifically, the first time domain plot 402 shows a ship motion forecast for one degree of freedom (e.g., a selected one of the six degrees of freedom). In this example the first time domain plot 402 represents a generated ship motion forecast for the next 60 seconds (i.e., from time 0 to time 60). The second time domain plot 404 illustrates a past ship motion forecast for the same one degree of freedom. In this example the second time domain plot represents a past ship motion forecast for the previous 60 seconds (i.e., from time −60 to time 0). Finally, the third time domain plot 406 illustrates past ship motion measurements for the same one degree of freedom. These are measurements of the actual ship motion that can be taken using one or more motion sensors (e.g., sensors 110) on the ship. The past ship motion measurements in the third time domain plot 406 are likewise illustrated for the previous 60 seconds (i.e., from time −60 to time 0).

In a typical embodiment a new first time domain plot 402 would be generated each cycle, e.g., for each processing cycle. Thus, for each cycle a new 60 second forecast is generated and displayed as the first time domain plot 402. The second time domain plot 404 and third time domain plot 406 could likewise be updated each cycle.

Notably, in the graphical representation 400 the past ship motion forecasts illustrated in the second time domain plot 404 can be easily compared to the past ship motion measurements in the third time domain plot 406. Thus, a user can readily discern the accuracy of the previous ship motion forecasts and use that information if determining how much weight to give the future ship motion forecasts shown in the first time domain plot 402.

As one more detailed example of the type of graphical representations that can be generated and displayed, the graphical representation of ship motion forecasts can include "scrolling forecasts". Such scrolling forecasts can again include ship motion forecasts for any of the six degrees of freedom. In such an embodiment, an ensemble of forecasts can be displayed together, with newer forecasts added to the top row and earlier forecasts shifting down a row on the display, such that the collection of forecasts "scrolls down" on the display. These graphical representations of ship motion forecasts can be combined with similar scrolling representations of past ship motion forecasts and past ship motion measurements. Detailed examples of such graphical representations are described in co-pending U.S. Patent Application "SYSTEMS AND METHODS FOR WAVE SENSING AND SHIP MOTION FORECASTING WITH SCROLLING FORECAST DISPLAYS" by John G. Kusters, Jr. et al, Ser. No. 15/704,832, filed on Sep. 14, 2017.

Figure 5:
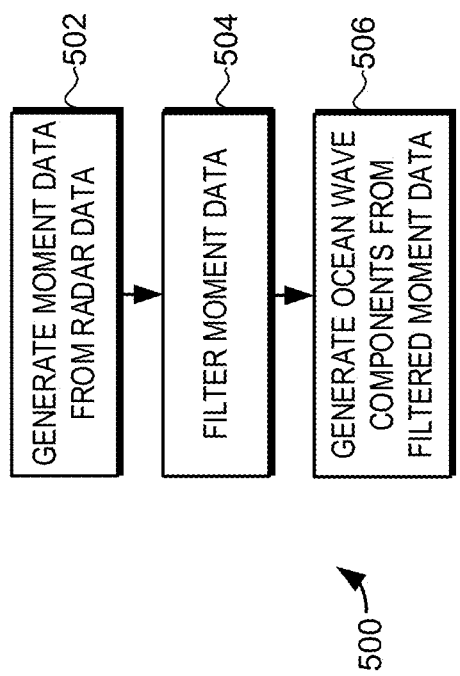
FIG. 5 is flow diagram of an exemplary ship motion forecasting method in accordance with various embodiments of the present invention.

As was described above, in some embodiments the ship motion forecasting systems and methods use radar data to determine ocean wave components, and from those ocean wave components determine future ship motion forecasts (See step 304 in method 300). A variety of different techniques can be used to generate such ocean wave components from the radar data. Turning now to FIG. 5, an exemplary method 500 of generating ocean wave components is illustrated. The method 500 is an example of the type of method that can be used to determine ocean wave components from radar data, and is particularly applicable to generating such ocean wave components from radar data that is generated by multiple radars.

The first step 502 is to generate moment data from the radar data. In general, the moment data can include frequency and power information statistically derived from the radar data. For example, moment data can comprise the frequency-shift value (i.e. Doppler shift) of the radar signal which corresponds to the velocity of the ocean surface patch at a particular azimuth, range, and time. Moment data can also include the power return of the radar signal and the signal-to-noise ratio. In in a typical embodiment step 502 would be performed for each processing cycle. Thus, new moment data can be generated for each scan of each radar. Furthermore, this radar data includes both in-phase (I) and quadrature phase (Q) components which are used to calculate the moment data.

As was described above, the radar data can include radar data from multiple radars. In these embodiments first moment data can generated from the first radar data generated by the first radar, while second moment data is generated from the second radar data generated by the second radar. The first moment data can then represent a frequency shift of the first radar signals, while the second moment data can represent a frequency shift in the second radar signals.

As one example, a method of moments analysis can be performed on the radar data from these multiple radars to determine the frequency shift for the returned radar signals for each patch of the water surface. Additionally, the method of moments analysis can determine both signal variance and signal power return for each patch of the water surface. The frequency shift of the returned radar signals, sometimes referred to as Doppler shift, results from the relative motion of the corresponding patch of water, and thus can be used to determine the wave velocity of the corresponding patch of water surface.

In one embodiment the methods of spectral moments analysis provide as a first moment a peak frequency shift, and as a second moment a distribution or variance of the frequency shift. From this, the methods of spectral moments analysis provides a distribution or spectrum of velocities for each patch of water. This distribution or spectrum of velocities can be characterized by its variance, and such a variance can be considered a measure of the signal to noise ratio of the distribution. For a more detailed example of such a spectral moments analysis see "Development of an Environmental and Ship Motion Forecasting System" by Benjamin S. H. Connell et al, Proceedings of the ASME 2015 34th International Conference on the Ocean, Offshore and Artic Engineering.

The next step 504 is to filter the moment data. In general, this filtering of the moment data is performed to identify and isolate the moment data that is likely relevant to making ship motion forecasts while removing other moment data. For example, the filtering can be performed on a sector-by-sector or patch-by-patch basis by identifying which sectors and/or patches of the water surface contain waves that are likely to significantly cause ship motion and isolating the moment data for those patches. By filtering the moment data to include only moment data that is relevant to ship motion forecasts the computational intensity of later steps in the process can be greatly reduced. Specifically, the number of ocean wave components that will be need to be generated from the moment data is significantly reduced by the filtering, and thus the process can be completed faster and with less computational resources.

In one embodiment, the step 504 keeps only the moment data from sectors and/or patches of water which have been identifies as containing wave features that are likely to impact the motion of the ship. This can be performed by identifying which sectors and/or patches contain wave-features that are moving at a speed and in a direction that will result in the waves hitting the ship, taking into account the location, speed and direction of the ship. To facilitate this information regarding the direction and speed of the ship can be provided by GPS and/or the ship navigation system.

Thus, in an embodiment with one or more radars, the filtering of first moment data can comprise filtering based at least in part on wave-feature speed and/or direction for each sector in a first plurality of sectors in the first portion of the body water to identify portions of the first plurality of sectors that contain waves relevant to forecasting ship motion. Likewise, the filtering of second moment data can comprise filtering based at least in part on wave-feature speed and/or direction for each sector in a second plurality of sectors in the second portion of the body water to identify portions of the second plurality of sectors that contain waves relevant to forecasting ship motion.

A relatively quick determination of the direction of waves in each patch can be determined by generating a two dimensional directional spectrum from the radar data without regard to wave phase or timing. This determination of the direction of waves and which waves will hit the ship can be made on azimuthal sector by sector basis, such that the moment data for sectors that contain waves moving in a direction that may impact the ship can be identified and kept, while the moment data for other sectors is filtered out. In making these determinations the waves in each of the various sectors can be assumed to closely follow linear wave theory where the speed of wave depends upon the wavelength or frequency of the wave.

As another example, the distance to waves in each patch can be quickly determined and patches that are too far or too close to impact ship motion in a selected time period can be excluded. In a typical embodiment these distances can be preconfigured based on typical wave speeds during set up of the wave forecasting system.

Furthermore, this filtering can be performed by identifying which patches contain waves having a period or frequency that is likely to induce significant motion in a degree of freedom of interest. In this case that would depend on the size and shape of the ship. For example, in system designed for a material transport ship the moment data for patches that contain waves having a period below 7 seconds and longer than 18 seconds may be filtered out as not likely to cause significant ship motion. Again, in a typical embodiment these periods of interest can be selected during set up of the wave forecasting system based on the parameters of the ship.

Thus, in an embodiment with multiple radars, the filtering of first moment data can comprise filtering based at least in part on wave period for each sector in a first plurality of sectors in the first portion of the body water to identify portions of the first plurality of sectors that contain waves relevant to forecasting ship motion. Likewise, the filtering of second moment data can comprise filtering based at least in part on wave period for each sector in a second plurality of sectors in the second portion of the body water to identify portions of the second plurality of sectors that contain waves relevant to forecasting ship motion.

Furthermore, this filtering can be configured to remove redundant radar data received from the multiple radars by filtering out overlapping data. Specifically, in this embodiment the filtered data from each of the multiple radars is limited to certain patches of the body water such that remaining data for each patch was received from only one radar. In this embodiment the filtered radar data that can be selected based on the relative positions of each radar, the power of the received radar signals from each radar, or noise in the radar data from each radar.

In other embodiments the moment data for patches with relatively high-energy waves are kept while moment data for low energy areas is filtered out.

In each of these examples the step 504 filters the moment data identify and isolate the moment data that is likely relevant to making ship motion forecasts. By filtering the moment data to include only moment data that is relevant to ship motion forecasts the computational intensity required for the next step can be greatly reduced.

The next step 506 is to generate ocean wave components from the filtered moment data. Again, these ocean wave components are discrete representations that describe a sensed wave, and in a typical embodiment new ocean wave components would be generated using the plurality of patches from several scans of the radar (tens of seconds), filtered by which patches contain information about wave-features that likely to impact future ship motions. When completely generated the collection of ocean wave components can define the portions of the water surface relevant to ship motion forecasting by wave frequency, direction of propagation, amplitude and phase. Furthermore, a linear superposition of these generated ocean wave components and their evolution in time can then be used to provide a deterministic forecast of the ocean surface elevation over a forecast interval.

A variety of techniques can be used to generate the ocean wave components. As a general example, a regression processes can be used to generate ocean wave components by iteratively selecting ocean wave components that loosely match the filtered moment data. Such a regression process can be considered to be an over-constrained least-squares fitting of the filtered moment data to the desired set of ocean wave components. This regression processes effectively facilitates the reconstruction of the relevant wave field from the filtered moment data, with that reconstruction taking the form of the generated ocean wave components. It should be noted again that the generated ocean wave components in this process are over-determined, and this allows the regression to overcome noise in the filtered moment data.

Generally the regression is configured to determine the number of ocean wave components necessary to define a stable solution for the portions of the water surface at interest. This number of ocean wave components can be predetermined and configured in the setup of the system.

As one example, in an implementation that utilizes on the order of ~100,000 pieces of moment data the system can be configured to generate ~1000 discrete ocean wave components.

With the ocean wave components generated they can be used to generate ship motion forecasts. As described above with reference to step 306 of FIG. 3, in one embodiment the ocean wave components are provided as inputs to a lookup database, with the lookup database then providing the resulting forecasts of ship motions from pre-calculated values. Thus, the system can facilitate the real time determination of several minutes of ship motion forecasts for each radar scan and each cycle of wave component calculation.

As was described above, the ship motion forecasting systems and methods described herein can use multiple radars to generate the ship motion forecasts. These multiple radars each transmit radar signals that reflect off the water surface, are received, and used to generate radar data. To facilitate the use of multiple radars in a ship motion forecasting system the radars can be configured to scan different areas of the water surface. In some embodiments these different areas can be non-overlapping while in other embodiments the different areas are partially overlapping.

Figure 6A:
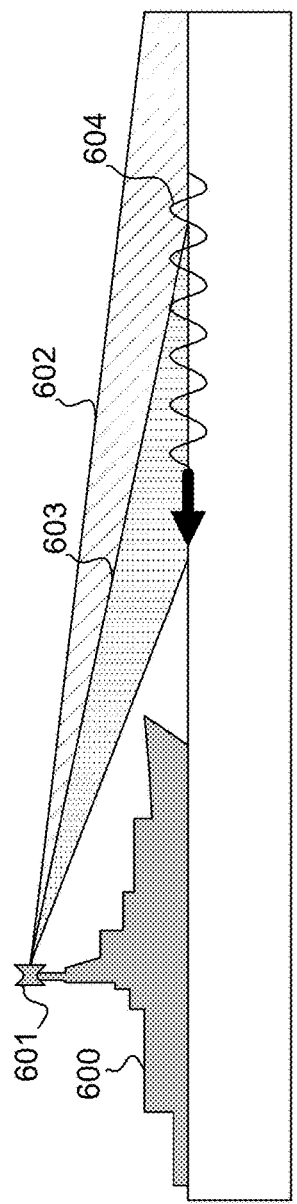
FIGS. 6A and 6B are schematic diagrams of an exemplary ship with a ship motion forecasting system in accordance with various embodiments of the present invention.
Figure 6B:
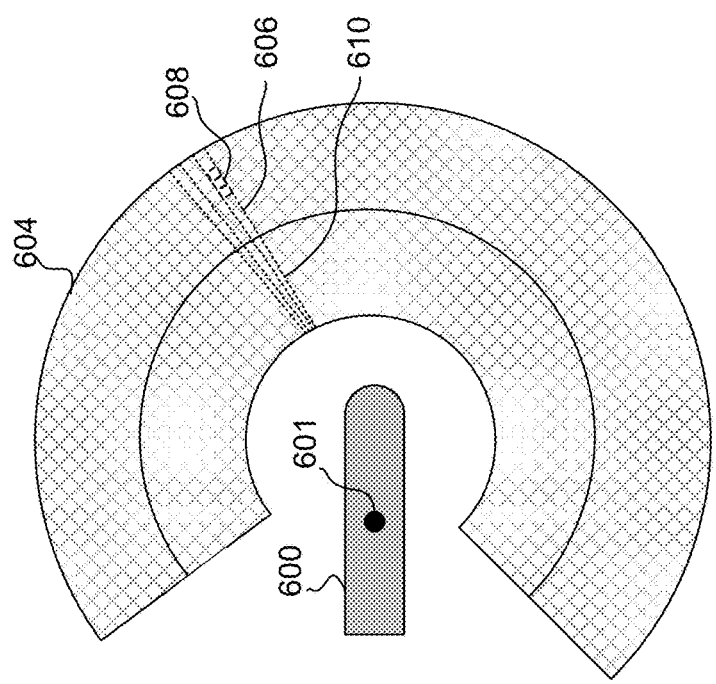

Turning now to FIG. 6A, a side view of an exemplary ship 600 with two radars 601 is illustrated, while FIG. 6B illustrates a top view. In this embodiment the antennas for the two radars 601 are mounted in the same general location on the ship 600, but they are configured to scan different areas of the water surface 604. Specifically, the first radar is configured to transmit radar signals 602 that reflect off the water surface 604 at areas relatively far from the ship 600. Such a configuration can be used to overcome minimum and maximum range limits for the radar. For example, the two radars 601 can provide full coverage for an implementation where a single radar cannot provide both scanning sufficiently near the ship (to detect close waves) and sufficient farm from the ship (to detect far waves).

Because the first radar performs a rotational scan these areas scanned by the first radar can be considered to comprise a first a plurality of azimuthal sectors 606. Likewise, the second radar is configured to transmit radar signals 603 that reflect off the water surface 604 at areas relatively close to the ship 600. Again, because the second radar performs a azimuthal scan these areas scanned by the second radar can be considered to comprise a second plurality of azimuthal sectors 610. The reflected radar signals 602 and 603 are received back at the ship 600 where they are used to determine a forecast of future ship motion. It should be noted that while the first plurality of azimuthal sectors 606 and the second plurality of azimuthal sectors 610 are not shown as overlapping, that in some embodiments the scan areas and resulting azimuthal sectors could partially overlap. Finally, it should be noted that FIGS. 6A and 6B are not drawn to scale, and that in a typical implementation areas of water surface 604 scanned by the radars 601 would be much larger relative to the ship of the ship 600.

Again, the radar signals 602 and 603 can be utilized and combined in multiple ways. In some embodiments, the radar data from radar signals 602 and 603 can be combined by generating moment data from the radar signals 602 and 603 separately, filtering the generated moment data, and then combining the filtered moment data to generate all of the ocean wave components. In yet other embodiments, the radar data from radar signals 602 and 603 can be combined by generating ocean wave components from radar signals separately and then combining the ocean wave components. For example, the radar signals 602 and 603 from non-overlapping angular regions can first be separately processed to generate ocean wave components for the non-overlapping angular regions, and then those ocean wave components can be combined.

Figure 7B:
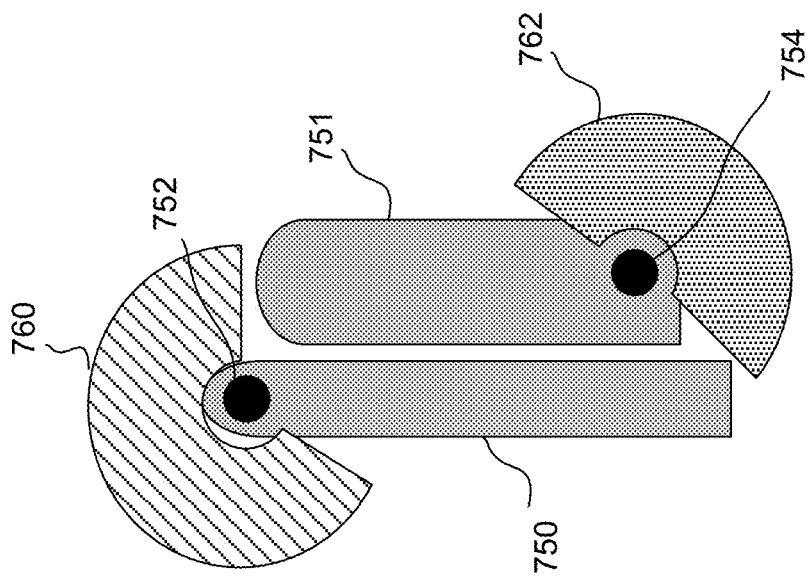
FIGS. 7A and 7B are schematic diagrams of exemplary ships with a ship motion forecasting system in accordance with various embodiments of the present invention.
Figure 7A:
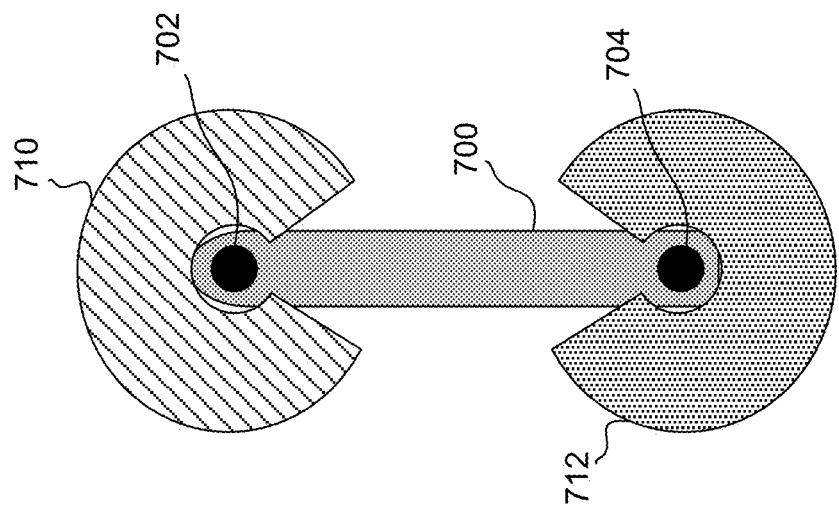

Again, this is just one example of how multiple radars can be configured and used for ship motion forecasting. Turning now to FIG. 7A, a top view of an exemplary ship 700 is illustrated. This ship includes a first radar 702 and a second radar 704 used for ship motion forecasting. At least the antenna for the first radar 702 is mounted in the fore area of the ship 700, while at least the antenna the second radar 704 is mounted in the aft area of the ship 700. The two radars 702 and 704 are configured to scan different areas of the water surface. Specifically, the first radar 702 is configured to transmit radar signals that reflect off the water surface in region 710, around the fore area of the ship 700. Thus, the first radar 702 has a view of the body of water proximate the fore region of the ship. The second radar 704 is configured to transmit radar signals that reflect off the water surface in region 712, around the aft area of the ship 700. Thus, the second radar 704 has a view of the body of water proximate the aft region of the ship. Again, these regions 710 and 712 can both be considered to comprise a plurality of azimuthal sectors defined by the scanning region of the corresponding radar. It should be noted that the regions 710 and 712 are not drawn to scale, and in a typical implementation the radars would be configured to scan a much larger area relative to the ship 700.

In this embodiment the two radars 702 and 704 can together provide a full-field (e.g., 360 degree) scan of the water surface around the ship 700. Furthermore, this 360 degree scan can be provided for ships were the structure and arrangement of the ship would block a full scan from a single radar. For example, where significant radar blocking structure (e.g., the main bridge) exists along the axis of the ship 700.

While FIG. 7A shows multiple radars 702 and 704 mounted together on a ship 700 this is again just one way to implement a ship motion forecasting system to use multiple radars. For example, in other embodiments the multiple radars can be spread across multiple different ships. Turning now to FIG. 7B, a top view of a first ship 750 and a second ship 751 is illustrated. The first ship 750 and the second ship 751 are illustrated as being mechanically coupled together, as could occur during a cargo transfer between the ships. Of course, this is just one example and the first ship 750 and the second ship 751 could instead be in different close proximity configurations.

The first ship 750 includes a first radar 752 and the second ship 751 includes a second radar 754. Specifically, at least the antenna for the first radar 752 is mounted on the first ship 750, while at least the antenna the second radar 754 is mounted on the second ship 751. The two radars 752 and 754 are again configured to scan different areas of the water surface. Specifically, in this configuration the first radar 752 is configured to transmit radar signals that reflect off the water surface in region 760, around the fore area of the ship 750 and ship 751. The second radar 754 is configured to transmit radar signals that reflect off the water surface in region 764, around the aft area of the ship 750 and ship 751. Again, these regions 760 and 762 can both be considered to comprise a plurality of azimuthal sectors defined by the scanning region of the corresponding radar. It again should be noted that the regions 760 and 762 are not drawn to scale, and in a typical implementation the radars would be configured to scan a much larger area relative to the ships 750 and 751.

It should be noted that in this embodiment a communication network between the radars 752 and 754 can be established and used to facilitate the collection of the radar data at a single ship motion forecasting system. For example, a wireless data network can be established between the two ships 750 and 751 and used to transfer the radar data from one ship to the other, where the ship motion forecasting of both ships can then be performed together on one unified system. It should also be noted that in some cases some processing of the radar data could be performed on one ship before the radar data is transferred to the other ship to reduce the data-rate of the communications network between the ships.

Again, the radar signals generated by two radars in FIGS. 7A and 7B can be utilized and combined in multiple ways. In some embodiments, the radar data from radar signals can be combined by generating moment data from the radar signals separately, filtering the generated moment data, and then combining the filtered moment data to generate all of the ocean wave components. In yet other embodiments, the radar data from the two radars can be combined by generating ocean wave components from radar signals separately and then combining the ocean wave components. For example, the radar signals from different radars scanning non-overlapping angular regions can first be separately processed to generate ocean wave components for the non-overlapping angular regions, and then those ocean wave components can be combined.

Figure 8:
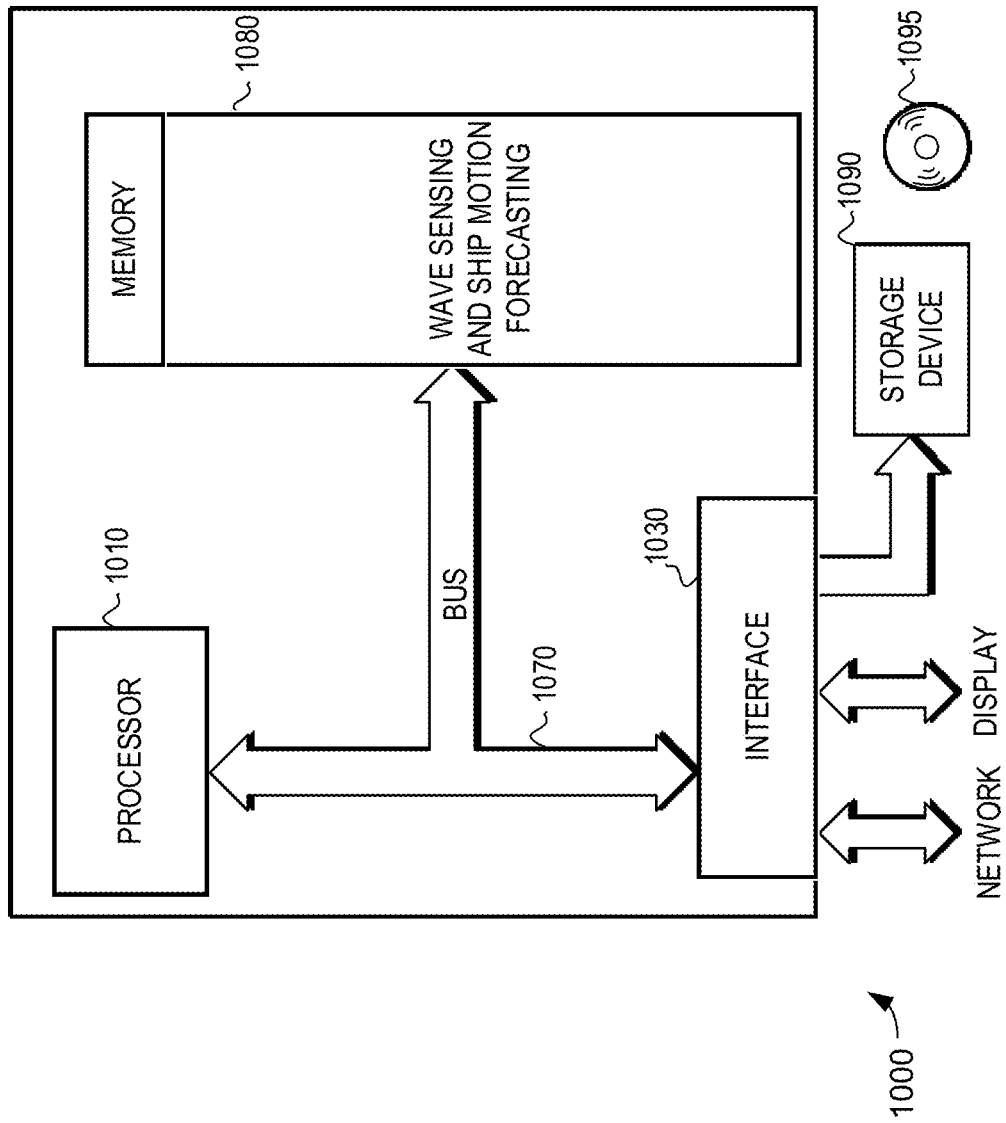
FIG. 8 is a schematic diagram of an exemplary processing system in accordance with various embodiments of the present invention.

Turning now to FIG. 8, an exemplary processing system 1000 is illustrated. Processing system 1000 illustrates the general features of a processing system that can be used to implement a ship motion forecasting system. Of course, these features are merely exemplary, and it should be understood that the invention can be implemented using different types of hardware that can include more or different features. It should be noted that the processing system 1000 can be implemented in many different environments, such as part of large networked computer system that spans multiple sites or as discrete individual computer system. For example, the processing system 1000 can implemented on a computer system aboard one or more ships for which ship motion forecasting is to be performed. The exemplary processing system 1000 includes a processor 1010, an interface 1030, a storage device 1090, a bus 1070 and a memory 1080. In accordance with the embodiments of the invention, the memory 1080 includes programs implementing the wave sensing and ship motion forecasting system. Thus, these programs can be implemented to perform the ship motion forecasting methods described above with reference to FIGS. 1-7B.

The processor 1010 performs the computation and control functions of the system 1000. The processor 1010 may comprise any type of processor, include single integrated circuits such as a microprocessor, or may comprise any suitable number of integrated circuit devices and/or circuit boards working in cooperation to accomplish the functions of a processing unit. In addition, processor 1010 may comprise multiple processors implemented on separate systems. For example, in the context of a multi-ship system (e.g., FIG. 7B) the processor 1010 could comprise one or more processors on a first ship and one or more processors on a second ship. In addition, the processor 1010 may be part of an overall larger computer system. During operation, the processor 1010 executes the programs contained within memory 1080 and as such, controls the general operation of the processing system 1000.

Memory 1080 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 1080 may be a single type of memory component, or it may be composed of many different types of memory components. In addition, the memory 1080 and the processor 1010 may be distributed across several different physical devices that collectively comprise processing system 1000. For example, a portion of memory 1080 may reside on one computer system, and another portion may reside on a second computer system. For a specific example, in the context of a multi-ship system (e.g., FIG. 7B) the memory 1080 could comprise memory components on a first ship and memory components on a second ship.

The bus 1070 serves to transmit programs, data, status and other information or signals between the various components of processing system 1000. The bus 1070 can be any suitable physical or logical means of connecting computer systems and components. This includes, but is not limited to, direct hard-wired connections, fiber optics, infrared and wireless bus technologies. It should also be noted that aspects of the processing system 1000 could be implemented as a single system on a chip (SoC). In such a case the bus 1070 can comprise the internal bus of the SoC.

The interface 1030 allows communication to the processing system 1000, and can be implemented using any suitable method and apparatus. It can include a network interfaces to communicate to other systems such on board ship navigation and control systems and, terminal interfaces to communicate with technicians, and storage interfaces to connect to storage apparatuses such as storage device 1090. Storage device 1090 can be any suitable type of storage apparatus, including direct access storage devices such as hard disk drives, flash systems, solid-state drives and optical disk drives. As shown in FIG. 8, storage device 1090 can comprise a disc drive device that uses discs 1095 to store data.

It should be understood that while the present invention is described here in the context of a fully functioning computer system, those skilled in the art will recognize that the mechanisms of the present invention are capable of being distributed as a program product in a variety of forms, and that the embodiments described herein apply equally regardless of the particular type of recordable media used to carry out the distribution. Examples of recordable media include: magnetic disks, flash memory devices, hard drives, memory cards and optical disks (e.g., disc 1095).

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

The forgoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

What is claimed is:

1. A method of providing a forecast of future ship motion, comprising:
   receiving first radar data from a first radar and receiving second radar data from a second radar, the first radar reflecting first radar signals off a first portion of a body of water, the second radar reflecting second signals off a second portion of the body of water;
   generating first moment data from the received first radar data, the first moment data representing a frequency shift in the received first radar signals;
   generating second moment data from the received second radar data, the second moment data representing a frequency shift in the received second radar signals;
   filtering the first moment data and the second moment data;
   generating ocean wave components from the filtered first moment data and the filtered second moment data;
   generating ship motion forecasts from the generated ocean wave components; and
   generating a graphical indication of the ship motion forecasts for display to a user.

2. The method of claim 1 wherein the first radar is positioned on the ship to have a view of the body of water proximate a fore region of the ship and wherein the second radar is positioned on the ship to have a view of the body of water proximate an aft region of the ship.

3. The method of claim 1 wherein the first radar is positioned on the ship to have a view of the body of water proximate a starboard region of the ship and wherein the second radar is positioned on the ship to have a view of the body of water proximate a port region of the ship.

4. The method of claim 1 wherein the first radar is positioned on a first ship, and wherein the second radar is positioned on a second ship.

5. The method of claim 1 wherein the filtering the first moment data comprises filtering based at least in part on wave-feature speed and direction for each sector in a first plurality of sectors in the first portion of the body water to identify portions of the first plurality of sectors that contain waves relevant to forecasting ship motion, and wherein the filtering the second moment data comprises filtering based at least in part on wave-feature speed and direction for each sector in a second plurality of sectors in the second portion of the body water to identify portions of the second plurality of sectors that contain waves relevant to forecasting ship motion.

6. The method of claim 5 wherein the filtering the first moment data and filtering the second moment data additionally comprises filtering based at least in part on direction and speed of the ship.

7. The method of claim 1 wherein the filtering the first moment data comprises filtering based at least in part on wave period for each sector in a first plurality of sectors in the first portion of the body water to identify portions of the first plurality of sectors that contain waves relevant to forecasting ship motion, and wherein the filtering the second moment data comprises filtering based at least in part on wave period for each sector in a second plurality of sectors in the second portion of the body water to identify portions of the second plurality of sectors that contain waves relevant to forecasting ship motion.

8. The method of claim 1 wherein the filtering the first moment data and filtering the second moment data comprises isolating overlapping moment data to remove redundant moment data.

9. A ship motion forecasting system comprising:
a first radar configured to reflect first radar signals off a first portion of a body of water;
a second radar configured to reflect second radar signals off a second portion of a body of water;
a processor;
a memory coupled to the processor;
a ship motion forecasting program residing in the memory and being executed by the processor, the ship motion forecasting program configured to:
receive first radar data from the first radar and receive second radar data from the second radar;
generate first moment data from the received first radar data, the first moment data representing a frequency shift in the received first radar signals;
generate second moment data from the received second radar data, the second moment data representing a frequency shift in the received second radar signals;
filter the first moment data and the second moment data;
generate ocean wave components from the filtered first moment data and the filtered second moment data;
generate ship motion forecasts from the generated ocean wave components; and
generate a graphical indication of the ship motion forecasts for display to a user.

10. The ship motion forecasting system of claim 9 wherein the first radar is positioned on the ship to have a view of the body of water proximate a fore region of the ship and wherein the second radar is positioned on the ship to have a view of the body of water proximate an aft region of the ship.

11. The ship motion forecasting system of claim 9 wherein the first radar is positioned on the ship to have a view of the body of water proximate a starboard region of the ship and wherein the second radar is positioned on the ship to have a view of the body of water proximate a port region of the ship.

12. The ship motion forecasting system of claim 9 wherein the first radar is positioned on a first ship, and wherein the second radar is positioned on a second ship.

13. The ship motion forecasting system of claim 12 further comprising a communication network between the first ship and the second ship to facilitate transfer of the second radar data to the first ship.

14. The ship motion forecasting system of claim 9 wherein the ship motion forecasting program is configured to filter the first moment data by filtering based at least in part on wave-feature speed and direction for each sector in a first plurality of sectors in the first portion of the body water to identify portions of the first plurality of sectors that contain waves relevant to forecasting ship motion, and wherein the ship motion forecasting program is configured to filter the second moment data by filtering based at least in part on wave-feature speed and direction for each sector in a second plurality of sectors in the second portion of the body water to identify portions of the second plurality of sectors that contain waves relevant to forecasting ship motion.

15. The ship motion forecasting system of claim 14 wherein the ship motion forecasting program is further configured to filter the first moment data and the second moment data based at least in part on direction and speed of the ship.

16. The ship motion forecasting system of claim 9 wherein the ship motion forecasting program is configured to filter the first moment data by filtering based at least in part on wave period for each sector in a first plurality of sectors in the first portion of the body water to identify portions of the first plurality of sectors that contain waves relevant to forecasting ship motion, and wherein the ship motion forecasting program is configured to filter the second moment data by filtering based at least in part on wave period for each sector in a second plurality of sectors in the second portion of the body water to identify portions of the second plurality of sectors that contain waves relevant to forecasting ship motion.

17. The ship motion forecasting system of claim 9 wherein the ship motion forecasting program is configured to filter the first moment data and filter the second moment data by isolating overlapping moment data to remove redundant moment data.

18. A ship motion forecasting system comprising:
a first radar configured to reflect first radar signals off a body of water;
a second radar configured to reflect second radar signals off a body of water;
a ship motion forecasting device, the ship motion forecasting device configured to:
receive first radar data from a first radar and receiving second radar data from a second radar, the first radar reflecting first radar signals off a first plurality of azimuthal sectors of a body of water, the second radar reflecting second radar signals off a second plurality azimuthal sectors of the body of water;
generate moment data from the received first radar data and the received second radar data by performing a method of moments analysis on the received first radar data and the received second radar data, wherein the generated moment data includes a first moment representing a peak frequency shift and amplitude for each of a plurality of patches in the first and second plurality of azimuthal sectors;
filter the moment data based at least in part on wave period and wave direction to identify portions of the first plurality of azimuthal sectors and second plurality of azimuthal sectors relevant to forecasting ship motion, each of the identified portions comprising a plurality of patches;
generate ocean wave components from the filtered moment data corresponding to the plurality of patches in the identified portions of the first plurality of azimuthal sectors and second plurality of azimuthal sectors, the ocean wave components including wave phase and wave amplitude for the plurality of patches in the identified portions;
generate ship motion forecasts from the generated ocean wave components;

generate a graphical indication of the ship motion forecasts for display to a user; and display a graphical indication of the ship motion forecasts to a user.

* * * * *